May 24, 1932.　　C. G. STRANDLUND　　1,859,896
PLOW
Filed May 31, 1929
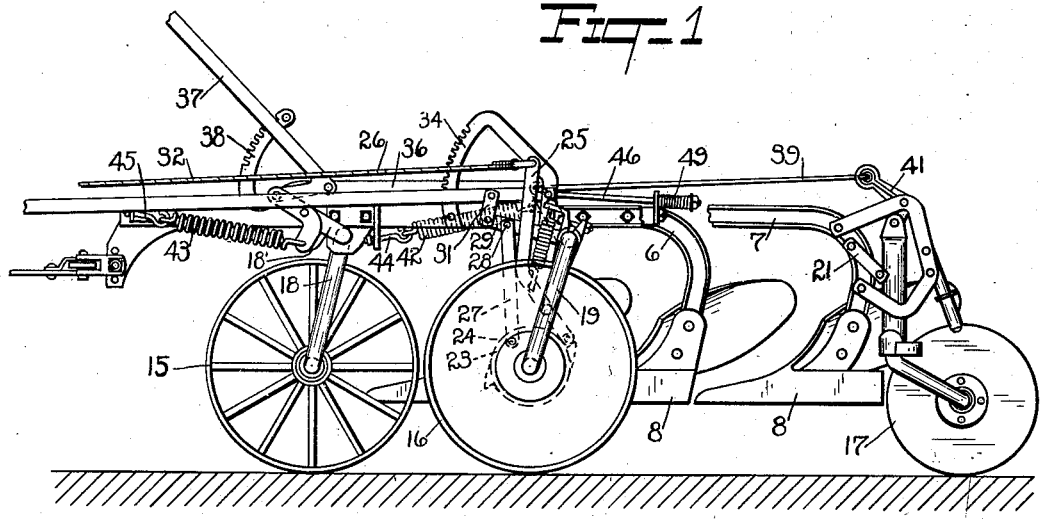
Fig-1
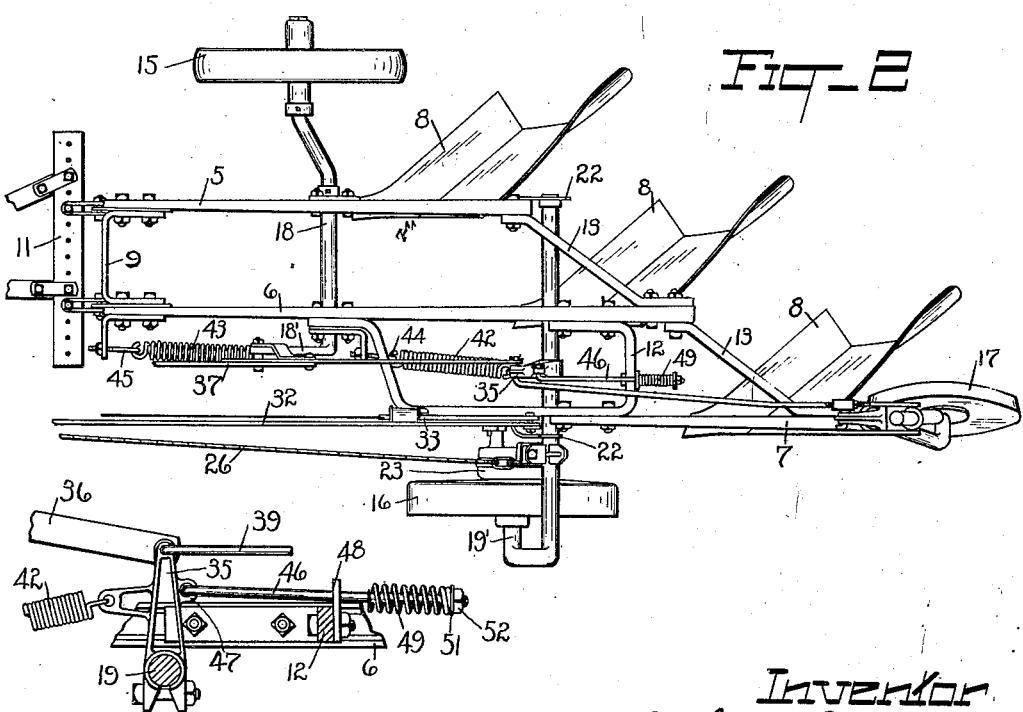
Fig-2
Fig-3
Inventor
Carl G. Strandlund
Brown, Jackson,
Boettcher & Dienner
By Attorneys Patented May 24, 1932

1,859,896

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed May 31, 1929. Serial No. 367,178.

The present invention relates to wheeled lift plows, and has to do primarily with improved means for aiding in lowering the plow from transport position to plowing position.

In wheeled lift plows, and particularly in that type of power lift plow wherein one or more of the lifting wheels are mounted on crank axles which swing backwardly in a lifting operation and forwardly in a lowering operation, conditions and adjustments can frequently be such that the plow does not tend to return promptly to plowing position after the lift mechanism has been tripped for lowering the plow.

For example, if the implement has been adjusted to plow comparatively shallow, as in plowing sod, when the implement is raised to transport position the degree of lift is higher than when the implement has been adjusted for deep plowing, and this necessarily means that the crank axle of the land wheel, and of the front furrow wheel where such is mounted on a crank axle, stands in a more nearly vertical position so that the weight of the implement does not exert much rotative force on said axle tending to swing the same forwardly for lowering the plow when the lift mechanism is tripped. If, combined with this shallow depth adjustment, the ground should be comparatively soft so as to offer material resistance to acceleration of the forward rolling movement of the lift wheel, it will frequently happen that the plow will not lower when the lift mechanism is tripped, necessitating backing of the implement or a manual operation to force the plow bodies down.

The general object of the present invention is to provide improved means which will correct this difficulty by exerting a force on the crank axle at such time as to swing it forwardly and accelerate the forward rolling movement of the lift wheel for lowering the plow.

This improved means, which is preferably spring means, is also characterized by a cooperating relation with the ordinary counterbalancing spring which tends to raise the plow to transport position, so that as energy is being stored in one spring it is being released from the other spring and vice versa.

The general construction and arrangement of the invention will be better understood by reference to the accompanying drawings wherein:

Figure 1 is a side elevational view, partly broken away, of a plow embodying my invention, the plow being shown in its transport position, Figure 2 is a plan view of the same, and Figure 3 is a detailed sectional view illustrating the operating relation of the improved spring means of my invention.

It will be understood that the general construction of the plow I am about to describe merely serves as an illustrative structure, and that the invention is broadly applicable to many types of power lift plows, irrespective of the arrangement of lift wheels, the number of plow bodies, and whether they be disk or moldboard, etc.

The frame of the structure shown is built up of the beams 5, 6 and 7 which extend forwardly from the three plow bodies 8. The front ends of the two beams 5 and 6 are connected together by a transverse frame bar 9, and the draft bar 11 and draft connections are shown as being pivotally connected to these beams. The beam 7 of the landward plow body is rigidly secured to a heavy frame member 12 which has its U-shaped rear end and its angularly bent front end secured to the intermediate beam 6. A pair of diagonal brace bars 13 extend between the rear portions of the three beams.

The frame is supported on the front furrow wheel 15, the landwheel 16 and the rear furrow wheel 17. In the construction illustrated I have shown the front furrow wheel 15 as being mounted on a swinging crank axle 18, such being a type of construction with which my invention is of maximum advantage, although it will be understood that any other type of lift connection may be employed between this front furrow wheel and the frame. The landwheel 16 is mounted on a swinging crank axle 19, and the rear furrow wheel 17 is mounted on any suitable lift connection generally indicated by the link means 21.

The crank axle 19 of the landwheel is suitably journaled in bearings 22 secured to the plow beams of the frame. The power lift mechanism for the implement comprises a power lift clutch 23 mounted on the spindle end 19' of the crank axle 19 and cooperating with all three wheels to transmit lifting effort for raising the frame. This type of power lift clutch is well known and need not be described in detail, it being sufficient to say that the tripping or engagement of the clutch transmits the traction power of the landwheel to a crank pin 24 for causing the latter to swing through a half revolution about the axis of the landwheel. The clutch is engaged by the actuation of a tripping lever 25 from which a rope 26 extends to the driver's position on the tractor so that the lifting and lowering of the plow can be controlled from this position. A link 27 extends upwardly from the crank pin 24 and is pivotally connected at 28 to a lever 29 suitably supported upon the frame, as upon the transverse portion of the crank axle 19. A link 31 is pivotally connected between the lever 29 and a relatively long depth adjusting lever 32 which is also pivotally supported on the frame. This depth adjusting lever 32 carries a suitable latching dog 33 for engaging with a notched latching sector 34 for holding the lever 32 in different depth adjustments. It will be evident that vertical movement of the lever 32 will act through the link 27 to swing the crank axle 19 forwardly or rearwardly relatively to the frame and thereby lower or raise the frame to different depth adjustments.

When the power lift clutch is engaged in a lifting operation the crank pin 24 swings through a half revolution to the position illustrated in Figure 1, which causes the crank axle 19 to be swung backwardly for raising the plow. Such oscillation of the crank axle is also transmitted to the other wheels 15 and 17 through an arm 35 which is mounted on the transverse portion of the crank axle. As shown in Figure 3, a link or bar 36 extends forwardly from a pivotal connection with the upper end of this arm 35 and at its front end has operative connection with an arm 18' extending upwardly from the inner end of the front crank axle 18. Interposed between the bar 36 and the crank arm 18' is an adjusting lever 37 which permits of the front furrow wheel 15 being used for independent depth adjustment or for leveling the plow. This lever 37 is pivotally mounted on the bar 36, has one arm pivotally connected with the crank arm 18', and carries a latching detent for engaging with a notched sector 38 formed as a curved forward extension of the bar 36. For transmitting lifting power to the rear furrow wheel 17, a rod 39 is also pivotally connected with the upper portion of a power arm 35 and extends rearwardly for effecting pivotal connection with an arm 41 which operates through the lifting connection 21 for raising the rear portion of the plow relatively to the wheel 17.

Hence, it will be seen that in the power lift operation the rearward oscillation of the crank axle 19, resulting from the engagement of the power lift clutch 23, swings the arm 35 forwardly and transmits power lifting movement to the front and rear portions of the frame so that the entire frame is raised to transport position relatively to all of these wheels, as illustrated in Figure 1.

To reduce the energy necessary to raise the plow, and to facilitate the making of depth adjustments, counterbalancing springs 42 and 43 are frequently employed for counterbalancing part of the weight of the implement. The spring 42 is shown as being connected at its rear end with the motion transmitting arm 35 and at its front end with an eye bolt 44 adjustably connected to the frame. The other spring 43 is shown as being connected at its rear end with an extension portion of the crank arm 18' and at its front end with an eye bolt 45 carried by the frame. When the frame is lowered to plowing position these two springs exert considerable tension on the crank axles 18 and 19, tending to swing the latter rearwardly and thereby counterbalancing part of the weight of the implement.

Figure 1 illustrates approximately the relative positions of parts when the plow is raised to transport position after having been adjusted for a shallow depth of plowing. It will be noted that the two crank axles 18 and 19 extend almost vertically, from which it will be seen that in the operation of lowering the plow the weight of the implement is only effective upon a comparatively short radius arm of each crank axle tending to swing the same forwardly in the lowering operation. Such forward swinging motion of these crank axles necessarily requires that the travel of the two wheels 15 and 16 be accelerated relatively to the travel of the implement. If the ground is soft and offers considerable resistance to this accelerated forward motion of the wheels 15 and 16 the frame may not lower or its lowering may be delayed beyond the point where it is desired to have the plow bottoms enter the ground. In correcting this condition, as previously described, I provide spring means which is operable at this time to transmit a forwardly swinging force to the crank axle 19 for carrying the latter to the point where its angular position will permit the weight of the implement to act more effectively for swinging the wheel 16 forwardly.

Referring to Figure 3, I provide a pull rod 46 which is pivotally connected at its front end to a lug 47 extending from the upper portion of the power transmitting arm 35. The rear portion of this rod extends through an apertured bracket plate 48 which is secured to the rear transverse portion of the frame member 12. A heavy compression spring 49 is mounted on the rearwardly extending portion of this rod 46, the rear end of said spring being adapted to engage a washer 51 which can be shifted to different points along the rod by the manipulation of a nut 52 which screws over the threaded rear end of the rod. The position of the arm 35 in Figure 3 corresponds to the lowered position of the frame when the implement is plowing. It will be evident that when the crank axle 19 swings rearwardly for lifting the plow to raised position the forward swinging motion of the arm 35 will compress the spring 49 between the bracket 48 and washer 51. The energy thus stored in the spring exerts a force on the arm 35 tending to swing the same rearwardly and the crank axle 19 forwardly. Hence, when the power lift clutch 23 is again tripped for lowering the plow this force effective on the crank axle 19 will swing the same forwardly notwithstanding its approximately vertical position and the retarding influence of soft soil, so that said axle will be swung into an angular position where the weight of the implement is more effective on the crank axle for oscillating the same forwardly and upwardly relatively to the frame.

Thus the provision of the spring 49 insures immediate lowering of the plow notwithstanding soil conditions. It will be noted that the pressure of said spring is also effective for swinging the other crank axle 18 forwardly, and is also transmitted to the rear lift connection 21.

The length of the spring 49 and the position of the washer 51 may be varied for different operating conditions, as desired. In the preferred arrangement, there is sufficient lost motion space between the spring and the bracket 48, or between the spring and the washer 51, so that the spring will not be effective in ordinary raised positions when the crank axle 19 is at a more pronounced angle to the vertical; that is to say, the spring will not be effective when the plow is raised from an ordinary or relatively deep plowing adjustment, because at this time the crank axle 19 does not swing back to the point where the weight of the implement cannot exert effective force on the axle for causing it to swing forwardly in lowering. It will be noted that the spring 49 does not interfere with the intended function of the two counterbalancing springs 42 and 43. This follows from the fact that the spring 49 is compressed only after the tension of springs 42 and 43 has been substantially released.

Conversely, counterbalancing springs 42 and 43 do not interfere with the desired function of the spring 49 because the tension in the two counterbalancing springs does not build up to the point of offering considerable resistance to the downward movement of the plow until after the spring 49 has been expanded substantially to its normal length. While such constitutes the preferred arrangement of the spring 49 it will be understood, however, that the proportions and adjustments may be made such that compression pressure will be stored in the spring 49 when raising from an average depth adjustment, or from any depth adjustment, as established by the setting of the lever 32.

Having thus described my invention what I claim as new and desire to secure by Letters Patent is:

1. In a power lift plow, the combination of a frame carrying a plow body, a supporting wheel for said frame, counterbalancing spring means tending to move said wheel in one direction relatively to said frame for raising said frame to transport position, and spring means adapted to exert a force on said wheel tending to move it in the other direction for lowering said frame to plowing position only after the counterbalancing force of said first named spring means has been substantially expanded.

2. In a power lift plow, the combination of a frame carrying a plow body, a crank axle mounted on said frame, a supporting wheel journaled on said crank axle, power lift means for moving said crank axle in one direction relatively to said frame for raising said frame to transport position, a counterbalancing spring connected with said axle and normally tending to move the same in the latter direction, spring means arranged to aid in moving said crank axle in the other direction for lowering said frame to plowing position, and means operatively connecting said latter spring means between said crank axle and frame whereby such spring means only has energy stored therein after the counterbalancing energy of said first named spring has been substantially dissipated.

3. In a power lift plow, the combination of a frame carrying a plow body, front and rear furrow wheels, and a landwheel supporting said frame, lift connections between each of said wheels and said frame, means actuated by the traction power of one of said wheels for moving said lift connections in one direction for raising said frame to transport position, depth adjusting means associated with said lift connections, spring means effective to transmit a force in the opposite direction to all of said lift connections to aid in lowering said frame to plowing position, and lost motion means for storing energy in said spring means only when said frame is raised to transport position from a relatively shallow depth adjustment.

4. In a power lift plow, the combination of a frame carrying a plow body, a crank axle carried by said frame, a supporting wheel mounted on said crank axle, power lift means for swinging said crank axle in one direction to raise said frame to transport position, depth adjusting means associated with said power lift means for governing the plowing depth of the implement, and a spring connected with said crank axle and arranged to be placed under deflection only when said frame is raised to transport position from a relatively shallow depth adjustment, whereby said spring will tend to swing said crank axle in the opposite direction and aid in returning said frame to plowing position.

5. In a power lift plow, the combination of a frame carrying a plow body, a crank axle journaled on said frame, a supporting wheel mounted on said crank axle, power lift means for swinging said crank axle in a rearward direction for raising said frame to transport position, depth adjusting means for said plow body associated with said power lift means, and a spring connected between said crank axle and said frame and arranged to be placed under compression only when said frame is raised to transport position from a relatively shallow depth adjustment, whereby said spring will tend to swing said crank axle in a forward direction and aid in returning said frame to plowing position.

6. In a power lift plow, the combination of a frame carrying a plow body, a crank axle supported for swinging movement on said frame, a supporting wheel journaled on said crank axle, power lift means for swinging said crank axle in a rearward direction relatively to said frame for raising said frame to transport position, depth adjusting means associated with said power lift means for governing the plowing depth of the implement, and a spring connected between said crank axle and said frame and arranged to have a stress developed therein only when as a result of the operation of said power lift means and the setting of said depth adjusting means said crank axle swings to a position almost vertical, whereby the reactionary force of said spring will aid in swinging said crank axle forwardly for returning the frame to plowing position.

7. In a power lift plow, the combination of a frame carrying a plow body, a crank axle having rocking support on said frame, a supporting wheel journaled on said crank axle, power lift means for swinging said axle in one direction relatively to said frame for raising said frame to transport position, depth adjusting means connected with said power lift means for governing the plowing depth of the implement, an arm extending from said crank axle, a link connected with said arm, and spring means operatively connected between said link and said frame and adapted to be placed under stress with the swinging of said crank axle to transport position, said spring means having lost motion relation between said arm and said frame whereby the spring means is only placed under stress when said frame is raised to the higher transport position resulting from lifting from a relatively shallow plowing adjustment, whereby the reacting stress of said spring tends to swing said crank axle in the opposite direction for returning said frame to plowing position.

8. In a power lift plow, the combination of a frame carrying a plurality of plow bodies, a front furrow wheel for supporting said frame, lifting connections between said wheel and said frame for raising the front portion of the frame to transport position, a crank axle having rocking support on said frame, a landwheel journaled on said crank axle, power lift means for swinging said crank axle rearwardly for raising said frame to transport position, means for transmitting such motion of said crank axle to the lift connections between said front furrow wheel and the frame for raising the same relatively to said wheel, depth adjusting means cooperating with said power lift means for determining the plowing depth of the implement, an arm extending from said crank axle, a rod pivotally connected with said arm, a bracket carried by said frame and engaging with an intermediate portion of said rod, and a compression spring mounted on said rod and adapted to be compressed between said bracket and an end stop on said rod when said crank axle is swung almost to a vertical position whereby the compression stress in said spring will aid in swinging said crank axle back to an angular position for returning said frame to plowing position.

9. In a wheeled plow, the combination of a plow body, a supporting wheel adapted to support said plow body in transport position, depth adjusting means, and means separate from said depth adjusting means and effective only when said plow body is lifted to transport position from a relatively shallow depth adjustment for aiding in lowering said plow body relatively to said supporting wheel.

10. A power lift plow comprising in combination a plow body, power lift means for moving said plow body to and from transport position, and a spring adapted to be placed under stress only when said plow body has been raised a predetermined amount toward transport position, the reacting stress of said spring tending to aid the lowering movement of said plow body to working position.

11. In a power lift plow, the combination of a frame carrying a plow body, a supporting wheel, a crank axle connecting said wheel with said frame, power lift means for swinging said crank axle in one direction relatively to said frame for raising said frame to transport position, and a spring adapted to be placed under stress only when the frame has been raised a predetermined amount toward transport position, the reacting stress of said spring tending to lower said frame to working position.

12. In a power lift plow, the combination of a frame carrying a plow body, a supporting wheel, a crank axle connecting said wheel with said frame, power lift means for swinging said crank axle in one direction relatively to said frame for raising said frame to transport position, and a spring connected between said crank axle and said frame and arranged to be placed under stress only when the frame has been raised a predetermined amount toward transport position, the reacting stress of said spring tending to move said frame to speed the movement of said frame to working position upon reverse movement of said power lift means.

13. In a power lift plow, the combination of a frame carrying a plow body, a supporting wheel, a crank axle connecting said wheel with said frame, power lift means for swinging said crank axle in one direction relatively to said frame for raising said frame to transport position, a relatively short spring and means including lost motion connections for connecting the spring between the crank axle and the frame, whereby the spring is arranged to be placed under stress only when the frame has passed through the greater part of its range of movement.

In witness whereof, I hereunto subscribe my name this 27th day of May, 1929.

CARL G. STRANDLUND.